UNITED STATES PATENT OFFICE 1,991,575

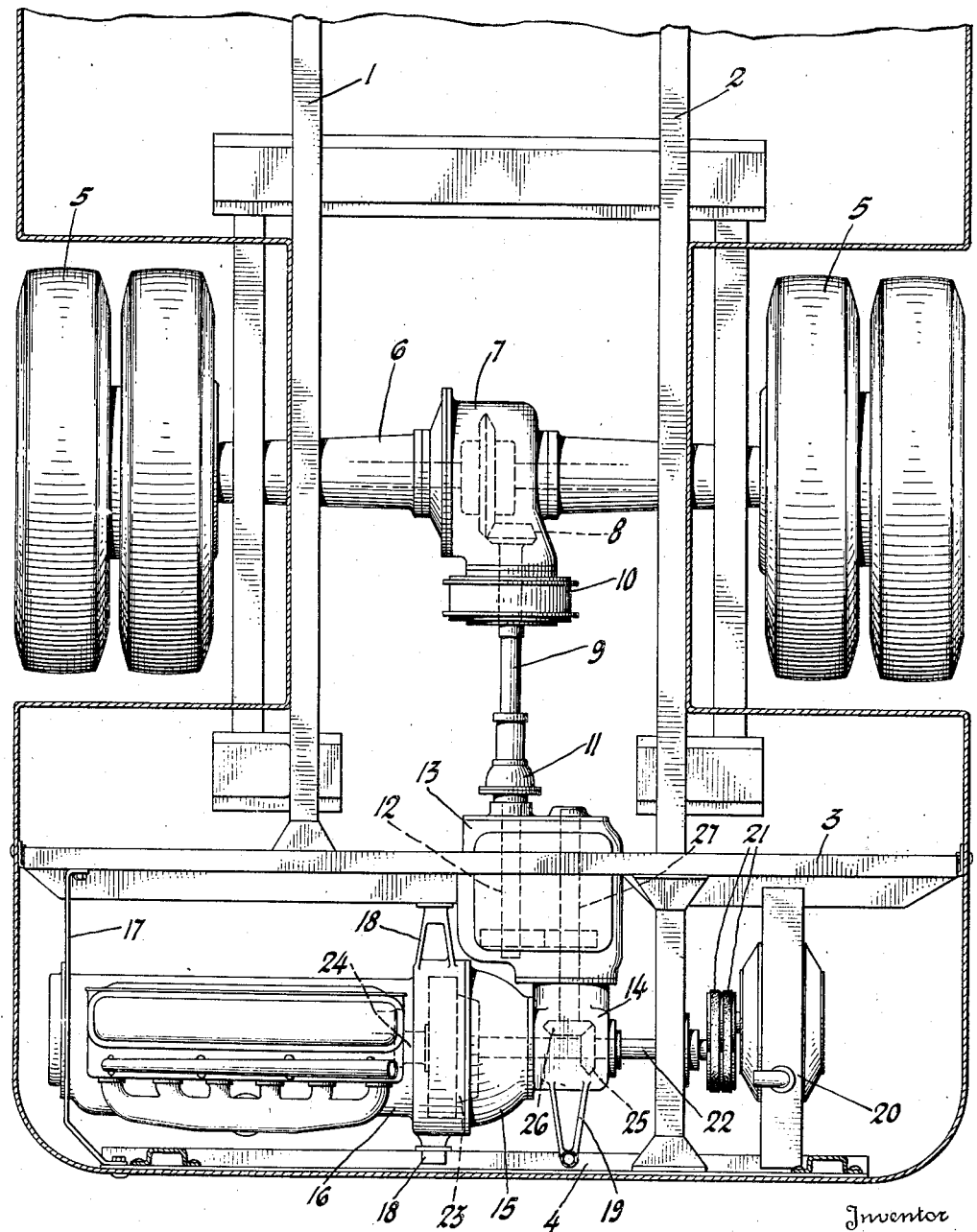

CROSS ENGINE DRIVE

William D. Reese, Birmingham, Mich., assignor to General Motors Corporation, Detroit, Mich., a corporation of Delaware Application January 20, 1934, Serial No. 707,460

6 Claims. (Cl. 180—70)

This invention relates to vehicles and particularly motor coaches, and its primary object is to provide an improved arrangement of the driving or propelling mechanism whereby maximum seating accommodation and passenger space is afforded.

A further object is to provide a rear end drive constructed and arranged to facilitate the use of standard parts and to avoid extensive modification of conventional vehicle equipment.

Accordingly, it is proposed in a street car type coach, with a differential centrally disposed between the driving axles, to mount close to the wheels a power plant constructed as a unit, with change speed gearing extending longitudinally of the vehicle in substantial alinement with the centrally disposed differential and at right angles to the engine and clutch, which extend transversely and to one side of the vehicle center line. To further conserve space, the radiator, forming a part of the engine cooling system, is mounted in transverse alinement with the engine and on the opposite side of the vehicle center line, and the fan or blower is driven through an extension of the shaft which couples the clutch and change speed gearing. By this arrangement of the power generating and transmitting elements, the vehicle may be provided with a low level floor extending throughout substantially the entire length and width of the vehicle and the space over the engine may be utilized for passenger seats thereby affording maximum space for pay load.

The accompanying drawing shows a preferred embodiment of the invention, the illustration consisting of a plan of the rear portion of a vehicle of the type wherein the driver and controls are located at the front after a common and approved fashion. The flooring which carries seats is secured upon a suitable framework including a pair of longitudinally extending main frame members 1 and 2, and a pair of rearwardly disposed transverse members 3 and 4, which support the side and end walls in the usual manner. The side member 2 extends the full length of the vehicle and supports the several transverse members which are also supported upon the frame member 1, but the member 1 ends short of the rear wall of the vehicle and adjacent the cross member 3 so as not to interfere with the space for the unitary power plant between the rearwardly disposed framing members 3 and 4.

This framework is supported front and rear through suitable springs upon road wheels according to conventional practice. In the drawing, the rear wheels are indicated at 5 on opposite ends of an ordinary live axle 6, having as a part thereof the centrally disposed differential housing 7. As a matter of choice, the wheels may be mounted on a dead axle or else independently sprung with the differential mounted on the frame and the drive to the wheels being through a pair of universally jointed shafts.

The drive pinion for the differential is shown in dotted lines at 8 mounted on the end of a propeller shaft 9, which also carries a braking element 10 and is connected through a universal joint 11 with the output shaft 12 of the change speed gearing enclosed within the housing or box 13. The gearing box 13 is mounted upon an elbow 14 which in turn is supported upon the bell housing 15 secured to the engine cylinder block 16, so that the several parts are joined together and combined as a unitary power plant, each element of which is of standard and conventional design, except for the elbow housing 14, which joins the gear box and bell housing.

The power plant may be mounted upon the frame in any suitable manner, as for example, by means of a plate 17 fastened at opposite ends to the transverse members 3 and 4 and at an intermediate point to the front of the cylinder block 16 together with side bearer arms 18 at the bell housing. In addition, and because of the overhanging weight of the offset gear box the elbow 14 may be provided with an integral arm 19 for attachment at its rear end with the frame member 4.

The engine 16 shown as of the internal combustion type, with its cylinders in line, is necessarily, of considerable length and for this reason it occupies the whole of the available space to one side of the vehicle center line. Consequently, it is proposed to place the radiator of the engine cooling system on the opposite side of the vehicle in the engine compartment and connected with the engine cylinder block through suitable hose or other conduit. In the drawing, the radiator 20 is shown as being of the circular tube type having a fan or blower centrally disposed and driven through belts 21 from the power shaft 22 which extends through the elbow 14 and into the bell housing 15, where it is connected by a suitable clutch 23 with the engine crank shaft 24.

Intermediate the radiator and clutch and within the elbow housing 14, the power shaft 22 carries suitable gearing, such as the bevel gear 25 meshing with the driven gear 26 on the input shaft 27 of the change speed mechanism so as to transmit the drive between the angularly disposed shafts 22 and 27. Because the engine and clutch are of such length as to extend beyond the vehicle center line, the change speed mechanism is such that the input and output shafts 27 and 12, respectively, are mounted in transversely spaced parallelism to present the output shaft inwardly toward the center line and in longitudinal alinement with the propeller shaft 9.

From the above description it will be apparent that there is thus provided a driving arrangement for a passenger bus which occupies little or no space which could be placed at the disposal of passengers and which, nevertheless, is readily accessible for inspection and repair and makes possible the use of existing power plant structure of proven design.

While the invention has been described more or less specifically, it will be understood that such obvious modifications may be made as come within the scope of the appended claims.

I claim:

1. In a motor vehicle, a frame, a pair of road wheels supporting the frame, a differential between the wheels on the vehicle center line, an engine supported on the frame rearwardly of the differential, with its power shaft extending transversely of the vehicle, power transmitting means between the engine and differential including change speed gearing having longitudinally extending and transversely spaced output and input shafts for alinement respectively with the centrally disposed differential and drive means on the power shaft at the end of the engine.

2. In a motor vehicle, a pair of road wheels having a differential therebetween, an engine disposed rearwardly of the differential and to one side of the vehicle center line, with a transversely extending crank shaft, a draft producing means of an engine cooling system located on the opposite side of the vehicle center line with a drive shaft therefor extending in line with the engine crank shaft, clutch mechanism for coupling said shafts, change speed mechanism in drive relation with the differential with shafting extending longitudinally of the vehicle, and power take-off means for said change speed gearing associated with said drive shaft between the clutch and said draft producing means.

3. In a motor vehicle, a frame, a pair of road wheels supporting the frame, differential mechanism centrally of the wheels, a multiple cylinder engine having its cylinders disposed transversely and substantially wholly on one side of the center line of the vehicle, a clutch transversely alined with the engine at the inner end thereof, change speed mechanism extending laterally of the clutch and having input and output shafts arranged in transversely spaced parallelism, angle drive means located on the other side of the vehicle center line and connecting the angularly disposed clutch and input shaft and a connection between the output shaft and the differential.

4. In a motor vehicle, a pair of road wheels, a frame supported on said wheels, differential mechanism between the wheels, a power plant carried by the frame and including an engine having its main shaft disposed transversely of the frame, clutch mechanism associated with said shaft, change speed mechanism constituting a unit with but laterally offset from the engine and having input and output shafts disposed at an angle to said engine shaft, angular drive mechanism connecting the clutch driven shaft with said input shaft and a propeller shaft connecting the output shaft with said differential mechanism.

5. In a motor vehicle supported upon drive wheels, a unitary power plant including a transversely disposed engine having a clutch housing associated therewith, an elbow casing having one leg rigid with said clutch housing, a variable speed gear box rigid with the other leg of the elbow casing and bevel gears enclosed by said elbow casing for connecting the clutch driven shaft with the input shaft of the gear box together with a driving connection between the drive wheels and the gear box.

6. A motor vehicle supported upon road wheels, propelling mechanism therefor, including differential drive means between a pair of road wheels, a transversely disposed engine spaced longitudinally from and to one side of the longitudinal center line of the differential drive means, a clutch in transverse alinement with the engine, clutch driven means on the other side of said longitudinal center line, and variable speed gearing in angular relation with said clutch and having an input shaft drive connected with said clutch driven means and an output shaft spaced transversely of the input shaft to bring the same into longitudinal alinement with the differential center line together with a driving connection between the output shaft of the variable speed gearing and the differential drive means.

WILLIAM D. REESE.